Patented Aug. 25, 1953

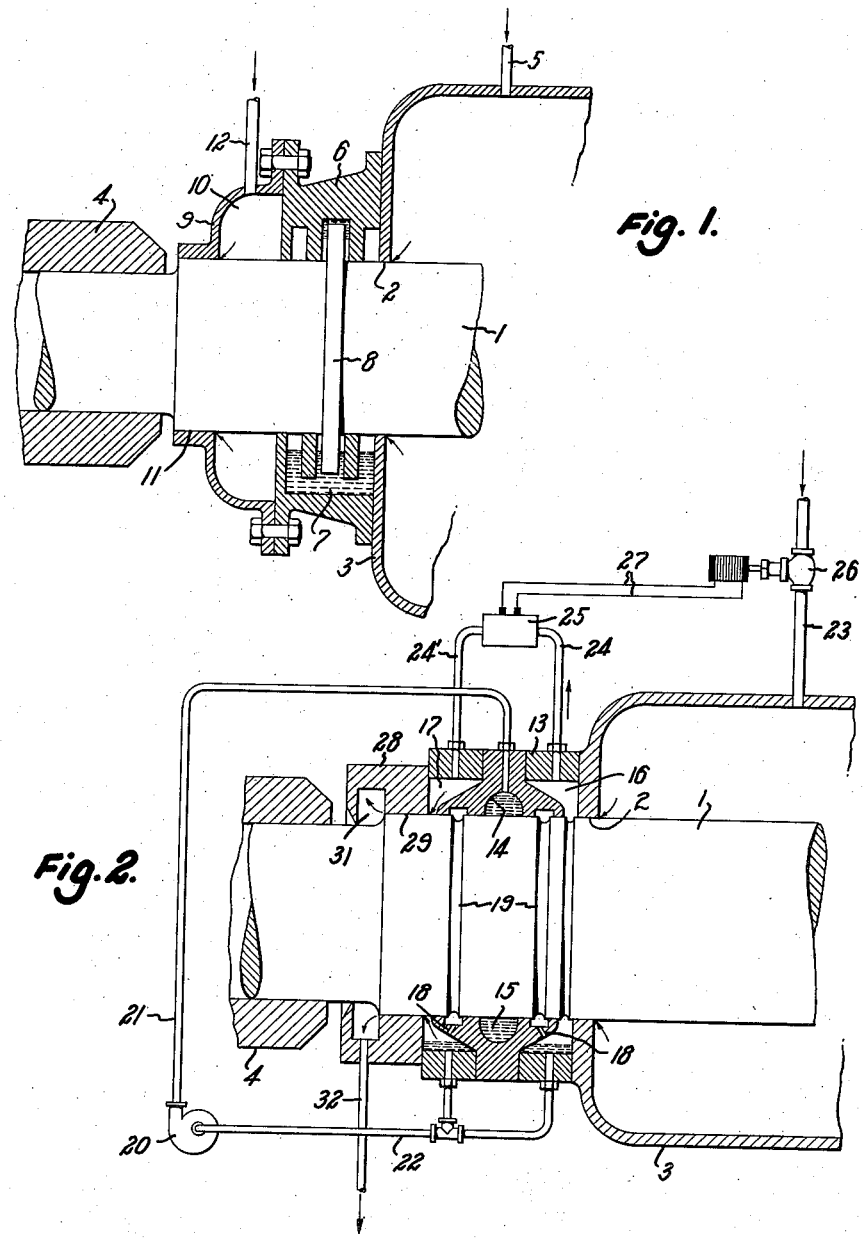

2,650,116

UNITED STATES PATENT OFFICE 2,650,116

FLUID SEALING GLAND

Robert Cuny, Baden, Switzerland, assignor to Aktiengesellschaft Brown, Boveri & Cie, Baden, Switzerland, a joint-stock company Application February 8, 1949, Serial No. 75,182
In Switzerland February 23, 1948

6 Claims. (Cl. 286—9)

1

This invention relates to electrical motors, generators and like machines of the gas-filled type and is particularly concerned with the problem of sealing the housing of the machine at the shaft opening to prevent loss of gas at the opening and also to prevent ingress of air at this point. The latter is particularly important where the gas is hydrogen and is used principally for cooling purposes. Leakage of air into the casing through the shaft opening not only contaminates the hydrogen filling and reduces the cooling efficiency of the gas but also is dangerous since the air-hydrogen mixture is volatile and may result in an explosion.

The object of this invention is to provide an improved shaft seal which is of comparatively simple construction and yet is most effective in the desired twin results of excluding air from the gas filled casing and preventing any substantial loss of gas from the housing at the shaft opening.

A more specific object is to provide an air tight seal between the shaft and the opening through which it passes to the interior of a gas filled housing comprised of a liquid packing which becomes saturated with the gas to be sealed off coupled with means for maintaining the packing liquid at a desired degree of saturation.

Another object is to provide for sealing off the shaft opening of gas filled generator and like housings by means of an enclosed liquid type ring seal in contact with the shaft periphery at a point outside of the shaft opening and a blocking chamber located adjacent the liquid seal at the side away from the shaft opening, the blocking chamber being filled with the same gas as is used in the housing and which discharges gas therefrom longitudinally along the shaft in the direction away from the liquid seal to prevent creepage of the surrounding air along the shaft to the sealing liquid where it is absorbed.

These and other objects and advantages inherent in the invention will become more readily apparent from the following detailed description of a preferred construction embodying the inventive concept when considered with the accompanying drawings in which Fig. 1 is a vertical section showing the improved shaft seal at one end of the machine housing; and Fig. 2 is a similar view illustrating a somewhat modified arrangement of the seal.

Referring now to Fig. 1, in which all structural details of the machine non-essential to an understanding of the invention have been purposely omitted in the interest of clarity, reference numeral 1 designates the shaft of an electric generator that passes through an opening 2 in the generator housing 3 and is journalled by bearing 4. The generator housing is filled with a gas such as hydrogen through an inlet pipe 5. The gas within housing 3 is maintained at a pressure slightly above that of the surrounding air to prevent ingress of air through any joints in the plates making up the housing that are not absolutely gas tight, and serves to cool the stator and rotor elements of the generator thereby improving its efficiency.

Secured to the end wall of the housing 3 adjacent the shaft opening 2 is an annular fitting 6 closely surrounding the shaft 1. This fitting is provided with a centrifgal type liquid seal 7 where the liquid packing such as oil absorbs the difference in pressure between the gas and the surrounding outer air and due to the centrifugal effect of the ring 8 on the shaft 1 forces the oil away from the latter and thus prevents any leakage of the oil during operation. Attached to the fitting 6 at the side away from the generator housing is another fitting 9 also surrounding shaft 1. This fitting includes an annular chamber 10 confronting the shaft 1 and is necked down at 11 to a comparatively close running fit with the shaft periphery. Chamber 10 is likewise filled with the same gas as is used in the housing 3, the gas being supplied thereto under superatmospheric pressure through pipe 12, and consequently serves to block off ingress of any air to the sealing liquid. A small amount of the gas in chamber 10 in performing its air excluding function will diffuse through the necked-down shaft opening 11 but the gas losses which are made up by the supply of fresh gas to chamber 10 are negligible and can be disregarded.

In the modified construction shown in Fig. 2, the fitting 13 secured to the end of housing 3 is so constructed as to provide, in addition to the circular groove 14 containing the liquid packing oil 15, a pair of annular chambers 16, 17 located to each side of groove 14, the lower portions of these chambers serving as a sump for receiving through passageways 18 such of the oil as is diffused along the surface of shaft 1 from groove 14 into the collecting grooves 19. The packing oil 15 is subjected to forced circulation in a closed circuit, and for such purpose a pump 20 is provided, the high pressure pump outlet being connected to the top of the oil groove 14 via pipe 21 and the low pressure pump return inlet being connected to the bottom, sump portions of chambers 16, 17 by piping 22, in which a float-valve is located for reducing the pressure in the oil sumps.

The shaft opening 2 in the generator housing 3 forms a comparatively close fit with the surface of the shaft 1 but the pressure of the gas within the housing admitted through pipe 23 is sufficiently high to cause it to diffuse into the adjacent chamber 16 through said opening.

Chambers 16, 17 are interconnected via piping 24, 24' in which is located a device 25. The device 25 includes a gas analyzer of any well known thermal conductivity type which measures the purity of the gas passing from chamber 16 to chamber 17, and also includes a reducing valve of conventional construction which operates in dependence upon the pressure of the gas, and which is arranged in series with the analyzer in one and the same casing. The combined device 25 serves to automatically regulate the admission of gas into housing 3 in dependence on the gas content inside the housing by means of an electro-responsive valve 26 placed in pipe 23 and connected to the control device 25 by wiring 27. The combined device 25 can of course be replaced by a manually operated gas flow regulating valve, and the valve 26 in pipe 23 is then constructed as an automatic pressure regulating valve which operates in dependence on the pressure in the housing 3.

As with the Fig. 1 construction, an additional fitting 28, corresponding in function to fitting 9 previously described, surrounds shaft 1 at the side of fitting 13 and includes an opening 29 that forms a close running fit with the shaft 1. Since the gas pressure in chamber 17 will be very slightly above that of the surrounding atmosphere, the gas will diffuse constantly and slowly from the latter through the opening 29 thus preventing any air from flowing in the opposite direction into chamber 17 from the exterior.

If the cooling gas used is hydrogen, it is advisable because of its explosive nature when mixed with air to collect the gas diffusing through opening 29 and carry the same off and discharge it into the atmosphere outside the machine room. For this purpose fitting 28 is provided with a collecting chamber 31 at the outer end of opening 29 and a gas discharge tube 32 for drawing off the gases which pass into such chamber.

The collecting chamber 31 can be disposed with if the opening 29 is provided with some form of seal or gland which prevents the gas in chamber 17 from escaping to the atmosphere. In this case some means must also be provided to relieve the pressure in chamber 17 when necessary.

Operation of the Fig. 2 arrangement is as follows: The gas, assuming it to be hydrogen, supplied to the generator housing 3 via pipe 23 flows through the generator parts and diffuses slowly through the opening 2 into the blocking chamber 16. Oil flowing away from the groove 14 along the surface of the shaft under the forced circulating action of pump 20 descends through passageways 18 into the sumps at the bottom of chambers 16 and 17.

On the assumption that the packing oil 15 is at first new and untreated and therefore contains some undesirable air, some of the air will be liberated by the oil and replaced by hydrogen as the latter reaches the inner blocking chamber 16. The air flows along with the hydrogen through pipe 24 into the metering and regulating device 25 in which the hydrogen-air mixture is brought to almost atmospheric pressure. From the device 25, the gaseous mixture then flows through pipe 24' into the outer blocking chamber 17. The packing oil diffusing into this chamber likewise liberates air and is replaced by hydrogen so that the hydrogen content of the gas-air mixture in chamber 17 is diminished again. From chamber 17, the gaseous mixture now diffuses outwardly through the gas lock 29 into chamber 31 and is drawn off through pipe 32.

By thus force-circulating the packing oil 15 so that any air initially in the same is gradually removed and replaced by hydrogen, the oil will ultimately be entirely liberated of all air and become saturated with hydrogen exclusively. Due to the increasing saturation of the packing oil 15 as the generator continues in operation, constantly less air reaches the inner and outer blocking chambers 16, 17 so that finally the hydrogen content in the oil will reach the hydrogen content inside housing 3.

In conclusion, it will be understood that the other end of the generator housing will be of like construction, and further that various departures from the illustrated construction may be made by those skilled in the art without, however, departing from the spirit and scope of the invention as defined in the appended claims.

I claim:

1. The combination with a generator or like machine provided with a housing adapted to be filled with a gas under pressure and a movable member within said housing, having a shaft extending outwardly through an opening in said housing to atmosphere, of a device for sealing the opening through which the said shaft passes, said device comprising an annular fitting surrounding said shaft exteriorly of the shaft opening in said housing and secured to said housing in a gas tight manner, a liquid type ring seal in said fitting surrounding and confronting said shaft, and a blocking chamber in said fitting surrounding the periphery of said shaft at the open air-side of said ring seal and through which said shaft passes to the surrounding atmosphere, said chamber being supplied with a protective gas maintained therein at a pressure above atmosphere and which discharges continuously along the surface of said shaft from said chamber in a direction away from said liquid seal thereby to establish a block against ingress of air longitudinally of said shaft into said liquid seal.

2. A sealing device as defined in claim 1 wherein said blocking chamber communicates with the interior of said machine housing and is supplied with gas therefrom.

3. A sealing device as defined in claim 1 and which further includes a collecting chamber positioned adjacent said blocking chamber and surrounding said shaft for collecting the gas discharged from said blocking chamber.

4. The combination with a generator or like machine provided with a housing adapted to be filled with a gas under pressure and a rotatable member within said housing having a shaft extending outwardly through an opening in said housing, of a device for sealing the opening through which the generator shaft passes, said device comprising an annular fitting surrounding said shaft exteriorly of the shaft opening in said housing and secured to said housing in a gas tight manner, a liquid type seal in said fitting surrounding and confronting said shaft, and a pair of blocking chambers in said fitting surrounding and confronting said shaft at opposite sides of said liquid ring seal, the blocking chamber at the side of said seal nearest said housing opening being in communication with said opening, said chambers being filled with the same pressure gas as used in said housing and also constituting sumps for the sealing liquid escaping along said shaft to each side of said liquid ring seal, and a pump system for force circulating the sealing liquid between said liquid ring seal and blocking chambers.

5. A sealing device as defined in claim 4 and which further includes pipe connections interconnecting said blocking chambers, a gas regulating unit interposed in said connections, and valve means for controlling admission of gas into said housing.

6. A sealing device as defined in claim 4 and which further includes pipe connections interconnecting said blocking chambers, a gas analyzer and regulating unit interposed in said connections, and valve means actuated by said unit for regulating the admission of gas into said housing.

ROBERT CUNY.

References Cited in the file of this patent

UNITED STATES PATENTS

| Number | Name | Date |
| --- | --- | --- |
| 2,125,446 | Hurtt | Aug. 2, 1938 |
| 2,137,064 | Ross | Nov. 15, 1938 |
| 2,159,057 | Sterrett | May 23, 1939 |
| 2,236,274 | Rice et al. | Mar. 25, 1941 |